Figure 1:
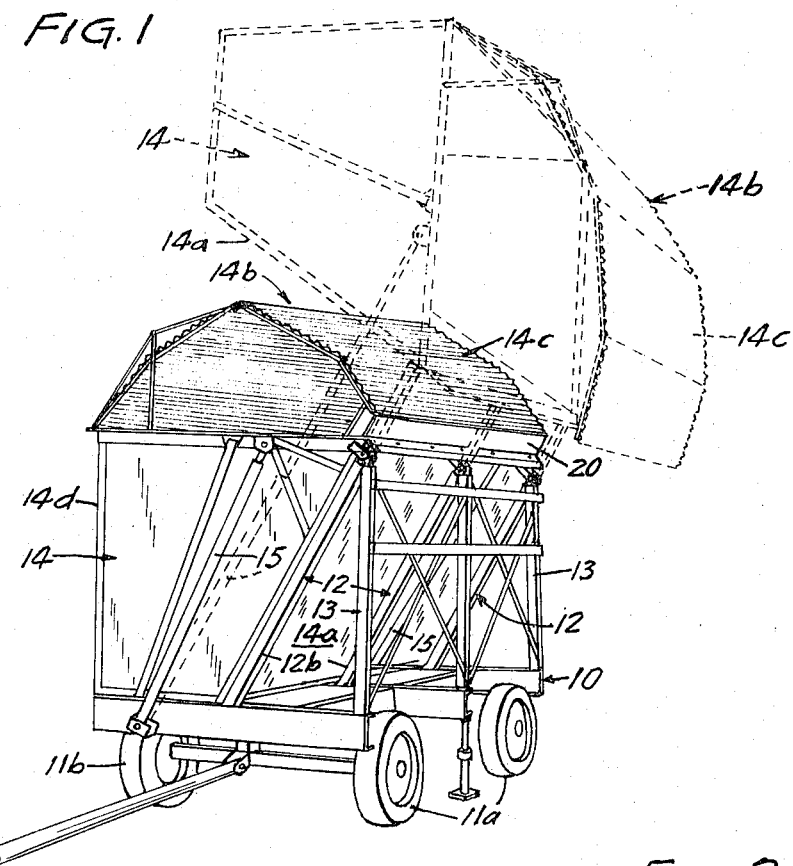

United States Patent [19]
Kostman

[11] 3,844,617
[45] Oct. 29, 1974

[54] DUMP BOX FARM WAGON

[75] Inventor: Wilmer A. Kostman, Barnesville, Minn.

[73] Assignee: Tegtmeier & Sons, Inc., West Fargo, N. Dak.

[22] Filed: July 31, 1972

[21] Appl. No.: 276,719

[52] U.S. Cl.................... 298/1, 214/38 R, 298/18, 298/23 C
[51] Int. Cl............................................ B60p 1/34
[58] Field of Search ...... 214/38 R, 43, 502; 298/11, 298/18, 23 C, 23 DF

[56] References Cited
UNITED STATES PATENTS

| 3,083,058 | 3/1963 | Walstrom et al. | 298/11 |
| 3,228,727 | 1/1966 | Paulson | 298/18 X |
| 3,362,085 | 1/1968 | Clifford et al. | 298/11 |
| 3,633,971 | 1/1972 | Berky | 298/11 X |
| 3,712,675 | 1/1973 | Schoenwald | 298/18 X |

Primary Examiner—Robert G. Sheridan
Attorney, Agent, or Firm—John W. Adams

[57] ABSTRACT

This is a farm wagon having a dump box specifically constructed to be raised and displaced laterally into dumping position to facilitate unloading into a large truck for efficient handling and transportation of harvest forage materials.

5 Claims, 2 Drawing Figures

DUMP BOX FARM WAGON

In the harvesting of crops, it has been a difficult problem to provide a forage collecting wagon which has a relatively lower center of gravity during the loading operation but can be dumped into a large truck box for efficient handling and transportation. If the upper edge of the dump box is raised to the desired dumping elevation above the sides of the truck box, the unit becomes excessively high and unstable while being towed across a field during normal loading operations.

It is an object of the present invention to provide a relatively high-capacity farm wagon having a dump box particularly designed to permit loading while in a relatively low stable position but being capable of being elevated a substantial distance to greatly facilitate dumping into a collecting truck box having high sides.

It is another object to provide a dumpbox farm wagon wherein the pivotal mountings for the dumping action are adapted to be elevated and simultaneously shifted laterally outwardly to position the pivoted edge of the box directly over the truck body into which the forage material is to be dumped.

It is still another object to provide a dump box farm wagon provided with a cover for confining the material but being automatically lifted from the dumping mouth of the box during the dumping operation.

Figure 2:
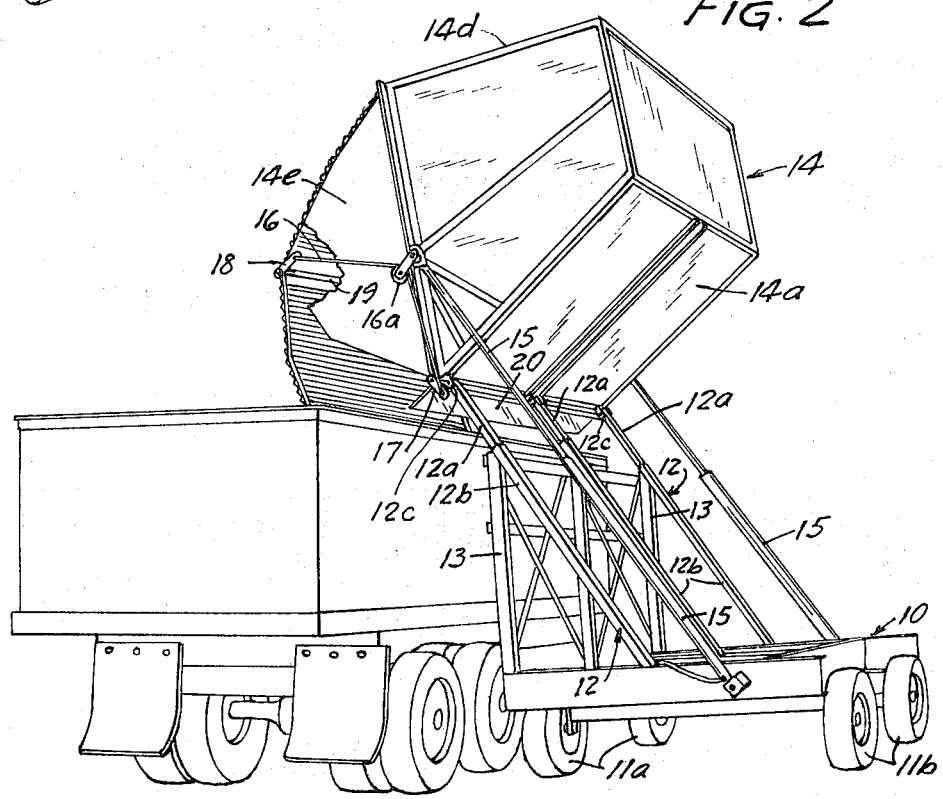

These and other objects and advantages of this invention will more fully appear in the following description made in connection with the accompanying drawings in which like reference characters refer to similar parts throughout the several views, and, in which;

FIG. 1 is a front perspective view showing the dump wagon box in lowered position by full lines and in dumping position by dotted lines; and FIG. 2 is a rear perspective view of the dump box showing the box in dumping position over a collecting truck.

The dump box farm wagon embodying this invention has a supporting frame structure or bed 10, with wheels 11a and 11b thereunder. A plurality of upwardly sloping extensible strut members 12, each having an upper extensible portion 12a and a lower stationary portion 12b, are fixed at their lower ends to an intermediate portion of the supporting bed 10 and extend upwardly and outwardly therefrom to the vertical plane through the wheels 11a on one side of said bed.

A rigid frame assembly 13 extends upwardly from the side edge of said bed to support the upper ends of the stationary portions 12b of the strut members. In the form shown, the extensible portions 12a of the strut members are telescopically received within the lower hollow stationary portions 12b and the side edge of the dump box 14 is pivotally mounted on pivot pins 12c on the upper ends of said extensible strut portions 12a. One side 14a of the dump box slopes at the same angle as the strut members 12 and is supported thereagainst when in lowered position.

The dumping mechanism consists in a pair of hydraulic rams 15 having their lower ends pivotally connected at the respective front and rear ends of the supporting bed 10 and their upper ends pivotally connected to the upper front and rear portions of the dump box as illustrated. During the initial extension of the hydraulic rams 15, the extensible members 12a of the strut members 12 are projected upwardly and outwardly into dumping position as shown in FIG. 2 and in the dotted position in FIG. 1. The rams 15 tilt the box 14 into dumping position as illustrated in FIGS. 1 and 2.

A cover 14b is provided to confine the material in the box during loading and transportation and is elevated during the dumping operation by means of a cable 16 which travels through a pulley 16a at the upper pivot point of one of the ram members and is fixed at one end to a lever arm 17 which is fixed to the pivot pin 12c fixed at the front end of the box. A crank arm 18 is connected at one end to the other end of said cable 16 and is fixed at its other end to a crank shaft or cross rod 19 which extends the length of the cover 14b and is fixed to the frame structure of the pivotally mounted door portion 14c thereof. When the box is tilted, the cable swings the crank arm 18 down to raise the door 14c as illustrated.

The box 14 has a panel 14d opposite to the sloping side panel 14a. The panel 14d is disposed in substantially vertical position when the box is in down position and provides for maximum load-carrying capacity and stability during loading and transporting. An upwardly extending rear end panel 14e supports the cover 14b and closes the rear end of the box below said cover.

The sloping side panel 14a of the box forms an inclined chute when the box is raised into dumping position and a chute extension panel 20 is provided at the dumping edge thereof to minimize spillage during the dumping operation.

It will be seen that this invention provides an ingenious, highly efficient dump box farm wagon which is particularly adapted for use with high large-capacity collector truck bodies by providing upwardly sloping extensible box-supporting struts which not only elevate the dumping edge of the box during the dumping operation, but also project the same laterally over the adjacent edge of the collector truck body. The cover 14b normally encloses the top of the box but has a shiftable door portion 14c which is automatically swung into open position by the dumping action of the box.

It will, of course, be understood that various changes may be made in the form, details, arrangement and proportions of the parts without departing from the scope of this invention which is defined by the appended claims.

What is claimed is:

1. A wheeled dump box comprising as essential elements only a supporting structure having sides and ends,
   wheels mounted under the sides of said supporting structure,
   a plurality of spaced apart upwardly and outwardly sloping extensible strut members mounted on said supporting structure and when in retracted position terminating at their upper ends substantially adjacent a vertical plane through wheels on one side of said structure, but being extensible upwardly and also laterally a substantial distance outwardly beyond said plane,
   a dump box unit having ends, sides and bottom and pivotally mounted along one upper side edge to the upper ends of said extensible strut members,
   a single pair of hydraulic actuators connected at their upper ends to the upper portions of the respective ends of the box and at their lower ends to the respective end portions of said supporting structure, said actuators forming the sole means for initially projecting said strut members into their extended position laterally outwardly a substantial distance beyond the vertical plane through the wheels to substantially overlie the adjacent edge of a truck body into which the box is to be dumped and for thereafter swinging said box into dumping position when said extensible strut members have been projected upwardly into extended position.

2. The structure set forth in claim 1 and said box having at least one side panel thereof sloping at substantially the same angle as said strut members with the upper ends of said struts pivotally connected to the upper edge of said sloping side.

3. The structure set forth in claim 2 and the sloping side panel of said box engaging the sloping strut members to be supported thereby when in normal loading position.

4. The structure set forth in claim 2 and the side of the box opposite to said sloping side being substantially vertical when in normal loading position.

5. A wheeled dump box comprising:
a supporting structure,
wheels mounted under the sides of said supporting structure,
a plurality of spaced apart upwardly and outwardly sloping extensible strut members mounted on said supporting structure and when in retracted position terminating at their upper ends substantially adjacent a vertical plane through the wheels on one side of said structure, but being extensible upwardly and also laterally outwardly beyond said plane,
a dumpbox unit pivotally mounted along one upper edge to the upper ends of said extensible strut members,
means for swinging said box into dumping position, when said extensible strut members have been projected upwardly into extended position,
a cover mounted across the top of said box with at least a portion thereof being rotatable into open position to permit the box to be dumped,
a shaft fixed to said rotatable portion to open said cover,
a crank arm fixed at one end to said shaft,
a cable fixed at one end to the other of said crank arm and at its other end to a portion of one said strut members at point disposed in downwardly spaced relation to the pivotal axis of said dump box to rotate said cover into open position, and
a guiding sheave mounted on said box at an intermediate point of said cable, with said cable trained therearound.

* * * * *